May 2, 1961 B. A. BUSS Re. 24,979
LAUNDRY MACHINES
Original Filed April 23, 1956
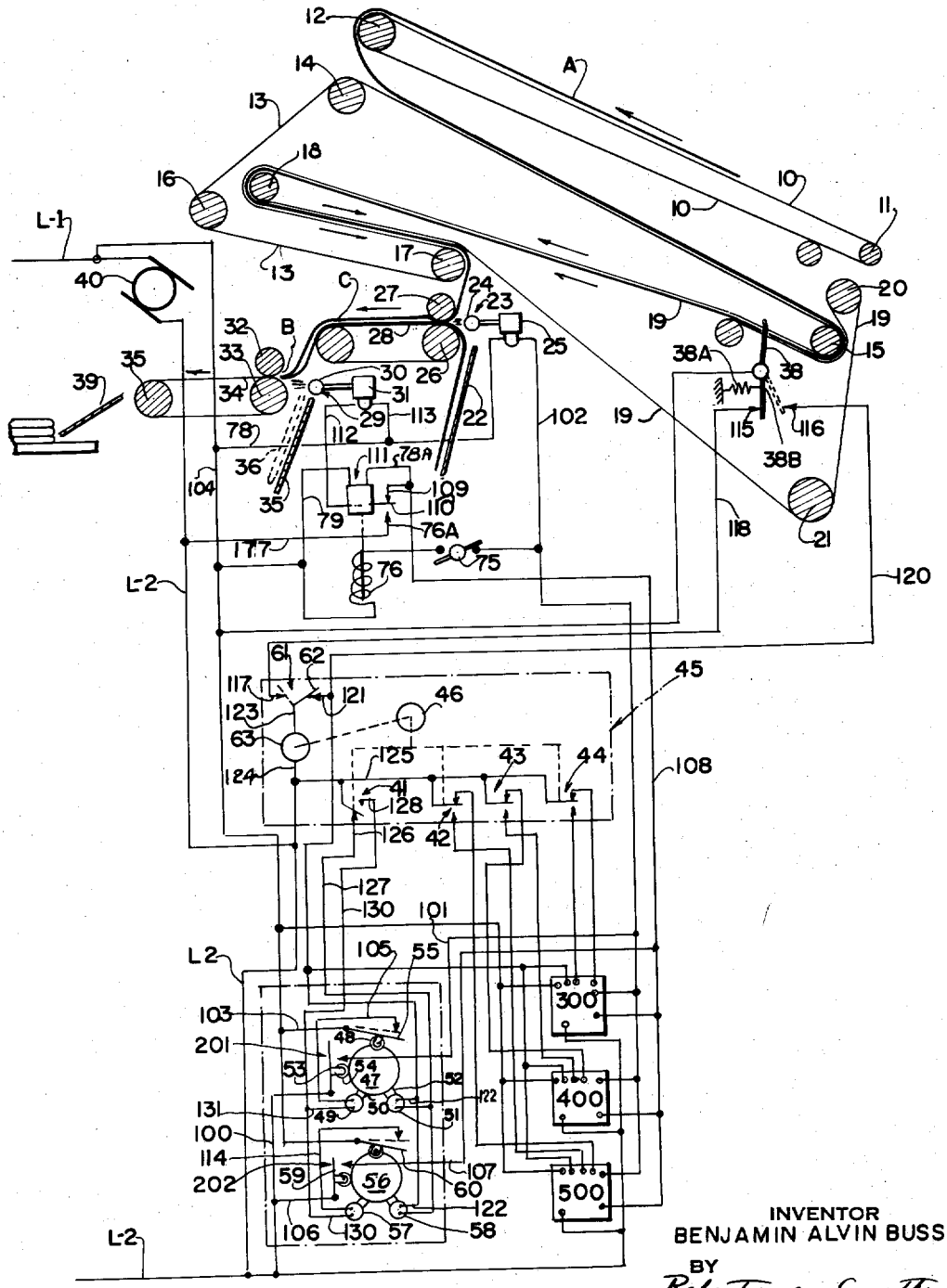
INVENTOR
BENJAMIN ALVIN BUSS
BY
Robertson and Smythe
ATTORNEYS United States Patent Office Re. 24,979
Reissued May 2, 1961

24,979

LAUNDRY MACHINES

Benjamin Alvin Buss, East Moline, Ill., assignor to American Machine and Metals, Inc., East Moline, Ill., a corporation of Delaware Original No. 2,852,251, dated Sept. 16, 1958, Ser. No. 579,947, Apr. 23, 1956. Application for reissue Nov. 17, 1960, Ser. No. 70,089

5 Claims. (Cl. 270—69)

Matter enclosed in heavy brackets [ ] appears in the original patent but forms no part of this reissue specification; matter printed in italics indicates the additions made by reissue.

This invention relates to an arrangement for article processing apparatus, such as used to fold bedsheets and the like, and more particularly to a control system therefor wherein the number of folds to be made in the article can be selected.

It often is desired to perform a series of timed or spaced folding operations upon articles which are successively fed into processing equipment of various sorts. For example, in commercial laundries the pieces of laundry, such as bedsheets, are washed, ironed and folded by automatically operating machines. The automatic sheet folding apparatus used employs a control system arranged to insure that the successive folding operations will be performed at selected proportionately spaced points on each sheet regardless of the length thereof. The number of folding devices employed in such a system usually corresponds to the number of folds desired in the sheets being folded. Frequently it is desired to vary the number of folds made in sheets run through the folding machine. One arrangement of such a timing and selecting control is found in applicant's copending application Ser. No. 545,872, filed November 9, 1955, or in Patent No. 2,652,246.

One of the objects of this invention is to provide an improved control system for article processing apparatus which can be operated selectively to make one or more folds in an article being folded.

A further object of this invention is the provision of a control system which is suitable for use with sheet folding apparatus employing folding devices of the pneumatic type and wherein the number of folds to be made in a sheet can be selected in a simple manner.

The invention will be described in conjunction with a folding machine which can receive ironed sheets from an ironing machine and convey the sheets over conventional conveyor means or belts past the various folding stations of the folding machine. Suitable measuring and timing arrangements are employed for selecting and setting timing means and activating the folding mechanism in accordance with the length of each sheet to be folded. One such selecting and timing mechanism is illustrated in the aforementioned application Ser. No. 545,872 and another is seen in Patent 2,652,246. The sheets to be folded are carried by the belt conveyor means, moved past a measuring finger and then downwardly to a first folding station in front of a folding arrangement, said folding arrangement preferably being in the form of a pneumatic blast folding device. The pneumatic blast means is activated by the timing means so that at the proper time, a blast of air is directed across the sheet to move a line of said sheet sidewise into contact with a pair of rotating folding rollers or roll means, the rollers or roll means engaging the sheet and drawing it therebetween to make a fold. The once folded sheet then is carried by a conveyor means downwardly in front of a second station having a similar pneumatic blast apparatus. The second pneumatic blast apparatus is arranged to be activated by said timing mechanism at a predetermined time if a second fold is to be made in the sheet. Upon activation, a line of the sheet properly spaced from the ends is carried between two rotating folding rollers to provide the second fold in the sheet.

Frequently, in operation of the folder, it is desirable to fold a sheet only once instead of twice or the preselected number. In order to accomplish such a change in folding pattern, a switching arrangement is provided in the present invention to activate the second air blast station in such a manner that the folded sheet upon reaching the second station will be carried directly between the second pair of folding rollers without performing a second folding operation thereon.

In a preferred form, this is accomplished by activating the second air blast at the same time as the first or before the edge of the sheet reaches a folding position relative to the second station. Thus, when the once folded edge of the sheet reaches the second station, it will be carried directly between the folding rollers and will not be folded thereby. The same principle can be followed after any number of folds, such depending upon the particular machine. When the timing mechanism normally operating to provide the second blast to make a second fold produces a signal, which would normally activate the second fold device, the second signal can be employed to deactivate the second air blast means.

These and other objects, advantages and features of the invention will become apparent from the following description and drawings, which are merely exemplary.

The drawing illustrates schematically a folding machine with which the invention can be used and the operating electrical circuit arranged to carry out the present invention.

In the drawing, a sheet A is illustrated on endless conveyor belt means 10, said belt being composed of the usual plurality of parallel ribbons passing around spaced rollers 11 and 12, the belt being driven in the direction shown by the arrow. Sheet A passes onto belt 13 guided by rollers 14, 15, 16, 17, 18. Endless belt means 19 cooperating with belt 13 is arranged to be guided by rollers 20, 15, 18, 17 and 21, belt 19 coming into contact with belt 13 adjacent roller 15 so that sheet A will be gripped between said belts 13 and 19 and carried along on its path. As the sheet passes over roll 17, it will be directed downwardly, its lower edge being guided by deflector shield 22, the sheet C passing in front of the first folding station or device 23.

The folding stations may comprise a pneumatic blast arrangement including manifold or pipe 24 extending across the machine, air thereto being controlled by a suitable solenoid operated valve 25, the valve being opened by a signal from the timing mechanism, as will be described at a later point.

When the sheet reaches a correct position in front of the air blast as determined by the measuring and timing apparatus, air blast solenoid 25 is energized so as to blow and move a center portion of the sheet between the first folding rolls 26 and 27. Belt 28 is guided by the first folding roller 26 and 27A. The sheet will be drawn between the first folding rolls 26 and 27 and carried as indicated onto belt 28.

The folded edge B of sheet C then will be moved on belt 28 so as to pass downwardly over roll 27A and in front of the second folding apparatus 29.

The second folding apparatus preferably comprises an air blast manifold or pipe 30 and solenoid 31 operable to control the flow of air from pipe 30 in a manner similar to the first station. The second folding rolls 32, 33 are arranged suitably in front of the second folding station 29. Belt 34 is guided by roll 33 and roll 35.

If a second fold is to be made in the sheet, the once folded edge B of sheet C will move downwardly as indicated in dotted lines 36 and be guided by the second fold station shield or guide 37. At an appropriate time and in proportion to the length of the sheet, the air blast folder 29 will be activated so as to cause the desired portion of the sheet to move sidewise into gripping relationship between folding rolls 32 and 33.

The air blast solenoids 25 and 31 are actuated at appropriate times in accordance with the timing mechanism as governed by sheet measuring switch or sensing finger 38. In the event that only a single fold is to be made, air blast 29 is activated by the timing mechanism so that the leading edge B of sheet C receives a blast of air before or as it reaches folding rolls 32, 33 so that the leading folded edge B will be drawn directly between the side rolls and carried to collecting station 39.

The various rolls and belts are driven in a suitable manner by a constant speed motor 40, which can be connected to line L1 and line L2. The motor may be a synchronous motor or any other arrangement to produce a constant speed.

One manner of carrying out the invention will be described in detail in conjunction with a sheet passing through a folding machine employing a timing mechanism, such as illustrated in Ser. No. 545,872. Normally, a plurality of timing and selecting means will be used, such as shown in said Ser. No. 545,872, but it is to be understood that other types of selecting and timing mechanisms can be employed, such as, for example, shown in Patent No. 2,652,246.

In order to control successive operations of folding mechanisms 23 and 29 and provide the successive timed blasts of air when a plurality of sheets one following the other pass through the machine, a plurality of timing mechanisms 200, 300, 400, 500 can be provided as needed. Each of the timing mechanisms governs folding operations of the air blast folding means 23 and 29. Copending applications Ser. No. 312,834 or 545,872 illustrate suitable timing mechanisms. Each of the timing mechanisms may consist of a plurality of subtiming devices, one for each of the folding means used. Timing devices 300, 400 and 500 may be similar to timing device 200.

Timing device 200 may have subtiming mechanisms 201, 202, subtiming mechanism 201 operating the first pneumatic blast folding mechanism and subtiming means 202 operating the second pneumatic blast timing mechanism at the desired time.

Each of the subtiming devices 201 and 202 in the timing mechanism 200 is controlled by measuring switch means 38 and motor switch means 41, other selector switches 42, 43, 44 being provided as indicated in block 45, said selector switches being operated, for example, by a cam means schematically shown at 46. As successive sheets pass the measuring switch, successive ones of the timing devices 200, 300, 400 and 500 will be activated so as to provide operation of the air blast means at the required time.

Subtiming device 201 controlling air blast means 23 may be composed of a cam 47 having an indentation 48 therein. High speed motor 49, of the constant speed type such as a synchronous motor, is adapted to drive cam 47 through overrunning clutch means 50, while low speed motor 51 also is adapted to drive cam 47 through overrunning clutch means 52. Thus, cam 47 can be driven by either of motors 49 or 51, the slow speed motor driving the cam as a sheet is passing the measuring finger.

A switch 53 is placed at a predetermined location relative to cam 47 and serves to operate the first station air blast means 23 when the indentation 48 on the cam is engaged by follower 54 of switch 53. Further along periphery of cam 47 is located switch 55 with an associated follower, switch 55 being operable to control energization of high speed motor 49 by means of the action of notch 48 and the follower.

The other subtiming device 202 controls operation of the second air blast folding means 29, and can be composed of cam 56 and motors 57 and 58 corresponding to similar elements in device 201, motors 57 and 58 having overrunning clutches to permit rotation of cam 56 by either of said motors. Switch 59 with its associated follower serves to control energization of air blast folding means 29, while switch 60 with its associated follower provides control of high speed motor 57. Switch 53 is connected to supply line L–2 by lead 100 and the fixed contact is connected to folding means 25 by leads 101, 102. Switch 55 is connected to supply line L–1 by leads 103, 104, while the fixed contact is connected to high speed motor 49 by lead 105. Switch 59 has its movable member connected to supply line L–2 by leads 106, 100 and its contact connected to folding means 29 by leads 107, 108, contact 109 and blade 110 of latch relay 111, lead 112, solenoid 31 and lead 113. Switch blade 60 is connected to supply line L–1 by lead 104 and the fixed contact is connected to high speed motor 57 by lead 114.

Measuring switch 38 is actuated by a sheet or other article between conveyor belts 13 and 19. A spring 38A, or other suitable biasing means, is provided to keep switch 38 in such a position that its article engaging portion is in position to be engaged by a sheet. In this position, the movable member 38B of the measuring switch engages fixed contact 115, whereas when a sheet is passing and depresses the article engaging portion of the switch, the member 38B engages fixed contact 116. Switch member 38B is directly connected to supply line L–1 through line 104, while contact 115 is connected to contact 117 of timer switch 61 by lead 118. Contact 116 is connected to the other contact 119 of timer switch 61 by leads 120 and 121. Leads 120 and 122 further connect contact 116 with one terminal of low speed motors 51 and 58. A movable member 62 of timer switch 61 is connected to one terminal of motor 63 by lead 123. The other terminal of the motor 63 is connected to supply line L–2 by means of lead 124. Lead 125 connects the movable members of cam actuated switches 41, 42, 43 and 44 with the supply line L–2. Contact 126 of cam actuated switch 41 is connected to low speed motor 51 by lead 127 and to low speed motor 58 by lead 127. The other contact 128 of switch 41 is connected to high speed motor 49 by leads 130 and 131 and to high speed motor 57 by lead 130. The remainder of the cam actuated switches 42, 43 and 44 are similarly respectively connected to timing mechanisms 300, 400 and 500.

It will be noted from the above description that each of the four motors 49, 51, 57 and 58 in timing mechanism 200 is energized by the supply lines L–1 and L–2. Connections of the drive motor 40 effectively relate the speeds of the conveyor belts to the speeds of rotation of the cams 47 and 56. The speeds of the drive motor 40 and high speed motor 49 are so related that a sheet between conveyor belts 13 and 19 would have its trailing edge folding point positioned adjacent the point at which folding means 31 is operated when cam 47 has completed a predetermined portion of a revolution. The speed of low speed motor 51 is related to the speed of high speed motor 49 in such a manner as to permit cam 47 to actuate switch 53 at a time when the proportionately spaced fold point of the sheet on the conveyor belt passes folding means 23. The speeds of motors of subtiming device 202 are similarly related to each other and to the speed of drive motor 40, so that comparable operation is effected for folding means 29.

Assuming initially that only timing mechanism 200 is operated, it can be seen that both low speed motors 51 and 58 will be energized when the leading edge of the sheet engages measuring switch 38. As soon as cams 47 and 56 start to rotate, the notches therein are moved out of engagement with the followers of switches 55 and 60, thus closing both of said switches. High speed motors 49 and 57 are not energized at this time, however, since the movable member of cam actuated switch 41 is connected to contact 126 rather than contact 128. Cams 47 and 56 continue to rotate at their low speeds until the trailing edge of the sheet passes the article engaging portion of measuring switch 38, at which time spring 38A forces the movable member 51 into engagement with contact 115. At this point, cam actuated switch 41 is operated by the sequence controller 45, as described in Ser. No. 545,872 to connect the movable member of 41 with contact 128 and thus energize the high speed motors 49 and 57. When the high speed motors 49 and 57 are energized, cams 47 and 56 are rotated at high speeds until the followers of switches 53 and 59 are engaged by the notches in the cams to operate folding means 23 and 29 at their correct times. Thus, it is evident that timing mechanism 200 operates in conjunction with measuring means 38 to selectively control the operation of folding means 23 and 29.

Motor 63 is connected across the supply lines L–1 and L–2 by a circuit consisting of movable members 38B, either of leads 118 or 120, the movable member 117 of timer switch 61 and lead 124. The relative positions of the movable members 38B and 62 of switches 38 and 61, respectively, determine whether lead 118 or lead 120 will complete the energizing circuit to the motor. When both switches 38 and 61 are in their normal positions as shown by the full line construction in the drawing, the energizing circuit for motor 63 is open and the sequence controller inoperative. Should the leading edge of a sheet placed on the belts actuate switch 38, an energizing circuit for 63 is completed through lead 120 causing the motor 63 to rotate. At this time, the low speed motors of timing mechanism 200 would also be energized as hereinbefore explained. The motor 63 will continue to rotate until timer switch 61 is actuated to the dotted line position shown in Fig. 1 of the drawing, when the energizing circuit for the motor will be broken.

After the trailing edge of the sheet passes the article engaging portion of the measuring switch 38, spring 38A becomes operative to return switch 38 to its normal position. When this occurs, the energizing circuit for motor 63 is completed through 118 since the movable member 117 of switch 61 is in the dotted line position shown. The cam mechanism in 45 is arranged so that motor 63 need only rotate a short distance before cam actuated switch 41 assumes its inoperative position and the next switch 42, its operative position. This same rotation of motor 63 has also rotated cam operated switch 61 to the full line position shown in the drawing wherein timer switch 41 has been returned to its normal position illustrated by the full line construction of the drawing. With the timer switch 41 again in its normal position, the energizing circuit for motor 63 is broken and the sequence controller is ready for the next sheet fed into the folding apparatus. High speed motors 49 and 57 of timing mechanism 200, are still energized through switch 61 even though control by the measuring switch 38 has been transferred to the low speed motors of timing mechanism 300. Thus, cams 47 and 56 of timing mechanism 200 continue to rotate at high speed and close switches 53 and 59 which control folding means 23 and 29, respectively. When cams 47 and 56 have completed one full revolution, switches 55 and 60 are opened as explained above, to deenergize the high speed motors.

In the aforementioned operation, pneumatic blast folding devices 23 and 29 are operated in their proper sequence in accordance with the length of the sheet so as to produce a double fold in the sheet.

In the event it is desired to produce only a single fold, switch 75 is closed so as to complete a circuit between line 102 and line L–1 through solenoid 76 of the mechanical latch type relay 111. The latch relay may take various forms, such as, for example, one known as Midget Latch Release made by Struthers-Dunn, Inc.

When switch 75 is closed and an impulse or signal is fed by the timing mechanism to solenoid 25, solenoid 76 also will be energized and this will move switch blade 110 from its upper position to make contact with the lower contact [76] *76A*. Such will also serve to energize solenoid 31 at the same time as solenoid 25 is energized. The circuit will be from line [L–1] *L–2*, [lead 104,] lead 177, contact [76] *76A*, blade 110, lead 112, solenoid 31, lead 113, lead 78 and line [L–2] *L–1*. This will serve to cause a blast of air to issue at 29 so that when the leading edge B of the sheet reaches this point, it will be removed directly between the folding rollers 22 and 23 without a fold. When cam 56 operates to produce the second impulse for operation of device 29 if a double fold were to be made, the impulse or signal will be fed through lead 108, lead [78], *78A*, a releasing coil (not shown) in latch relay 111, lead 79, lead 104 and lead L–1. This will cause the latch relay to return to the full line position shown in the drawing and thus de-energize solenoid 31. The circuits then are ready for the next operation and will continue to produce a single fold until switch 75 is opened.

The air blast folding arrangement is preferred but other types of folding arrangements might be employed. It is to be understood that modifications and variations may be made in the described mechanism and system without departing from the spirit of the invention except as defined in the appended claims.

What is claimed is:

1. In a flexible sheet folding machine, the combination including a first roll means, air blast means arranged opposite said first roll means, means feeding a sheet to be folded in a path between said air blast means and said roll means, a second roll means, a second air blast means arranged opposite to said second roll means, means for conveying a folded sheet from said first roll means to a path between said second roll means and said second air blast means, means for sequentially activating said air blast means in relation to the length of a sheet to be folded and pattern of fold so as to fold said sheet in a predetermined pattern, and means for selectively activating said air blast means before and until the edge of the sheet reaches said second roll means so that said second air blast means is activated before the sheet reaches the same when only one fold is desired.

2. In a flexible sheet folding machine, the combination including a first roll means, air blast means arranged opposite said first roll means, means feeding a sheet to be folded in a path between said air blast means and said roll means, a second roll means, a second air blast means arranged opposite to said second roll means, means for conveying a folded sheet from said first roll means to a path between said second roll means and said second air blast means, means for sequentially activating said air blast means in relation to the length of a sheet to be folded and pattern of fold so as to fold said sheet in a predetermined pattern, and means for selectively activating both of said air blast means before and until the edge of the sheet reaches the roll means which is not to make a fold when only one fold is desired.

3. In a flexible sheet folding machine, the combination including a first roll means, air blast means arranged opposite said first roll means, means feeding a sheet to be folded in a path between said air blast means and said roll means, a second roll means, a second air blast means arranged opposite to said second roll means, means for conveying a folded sheet from said first roll means to a path between said second roll means and said second air blast means, means for sequentially activating said air blast means in relation to the length of a sheet to be folded and pattern of fold so as to fold said sheet in at least two folds, and means for selectively activating both of said air blast means to produce only one fold, before and until the edge of the sheet reaches said second roll means the leading edge of said sheet being moved directly into said second roll means when said second air blast means is activated before the sheet reaches it.

4. In a flexible sheet folding machine, the combination including a first roll means, air blast means arranged opposite said first roll means, means feeding a sheet to be folded in a path between said air blast means and said roll means, a second pair of roll means, a second air blast means arranged opposite to said second roll means, means for conveying a folded sheet from said first roll means to a path between said second roll means and said second air blast means, timer means for sequentially activating said air blast means in timed relation to the length of a sheet to be folded and pattern of fold so as to fold said sheet in at least two folds, means for selectively activating both of said air blast means so that said second blast is activated before and until the edge of the sheet reaches said second roll means so as to produce only one fold and means activated by said timer means at the time for normally activating the second blast for the second fold to cut off the second blast of air to the roll means.

5. In a flexible sheet folding machine, the combination comprising a first pair of folding roll means, first air blast means horizontally arranged relative to said first roll means, first valve means for said first air blast means, means feeding a sheet to be folded in a substantially vertical path between said air blast means and said roll means, a second pair of folding roll means, a second air blast means horizontally arranged relative to said second roll means, second valve means for said second air blast means, means for conveying a folded sheet from said first roll means in a substantially vertical path between said second roll means and said second air blast means, sheet measuring and timer means for sequentially operating said first and second valve means to produce a predetermined fold pattern, and means selectively activating both of said valve means at the time of the first fold, said second valve means being activated during the time that the leading edge of the once folded sheet approaches the second roll means so that the leading edge of said folded sheet enters said second pair of roll means without being folded thereby.

References Cited in the file of this patent or the original patent

UNITED STATES PATENTS

| | | |
|---|---|---|
| 2,158,896 | Charles et al. | May 16, 1939 |
| 2,374,779 | Preston | May 1, 1945 |